US010836561B2

(12) United States Patent
Martin et al.

(10) Patent No.: US 10,836,561 B2
(45) Date of Patent: *Nov. 17, 2020

(54) AEROSOL DISPENSER

(71) Applicant: The Procter & Gamble Company, Cincinnati, OH (US)

(72) Inventors: Matthew John Martin, California, KY (US); Andrew William Franckhauser, Batavia, OH (US); Douglas Bruce Zeik, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,523

(22) Filed: Oct. 8, 2019

(65) Prior Publication Data
US 2020/0109000 A1 Apr. 9, 2020

Related U.S. Application Data

(60) Provisional application No. 62/742,497, filed on Oct. 8, 2018.

(51) Int. Cl.
  *B65D 83/38* (2006.01)
  *B65D 83/40* (2006.01)
  *B65D 83/68* (2006.01)

(52) U.S. Cl.
  CPC ........... *B65D 83/384* (2013.01); *B65D 83/40* (2013.01); *B65D 83/682* (2013.01)

(58) Field of Classification Search
  CPC .......... B67D 1/12; B67D 1/125; B65D 83/70; F16K 24/02; F16K 24/04
  See application file for complete search history.

(56) References Cited

U.S. PATENT DOCUMENTS 2,863,699 A    12/1958   Elser
3,083,854 A *   4/1963   Lusher ............... B65D 23/0814
                                              215/307

(Continued)

FOREIGN PATENT DOCUMENTS

GB       2205614 A    12/1988
JP      H07300168 A    11/1995

(Continued)

OTHER PUBLICATIONS

International Search Report and Written Opinion, PCT/US2019/055097, dated Jan. 15, 2020, 12 pgs.

*Primary Examiner* — Paul R Durand
*Assistant Examiner* — Randall A Gruby
(74) *Attorney, Agent, or Firm* — Sarah M. DeCristofaro; James E. Oehlenschlager

(57) ABSTRACT

An aerosol dispenser, an outer container for an aerosol dispenser, and a preform for an outer container. The aerosol dispenser, outer container, and preform each have a neck including a crimp ring. The crimp ring may be configured to receive a valve cup, which is clinched thereto. The crimp ring includes one or more vents. The vents may be used to control overpressurization within the dispenser. The vents may be exposed to pressurized propellant and product due to deformation of the neck during undue overpressurization. The vents allow propellant and/or product to be released therethrough in the event of overpressurization.

15 Claims, 13 Drawing Sheets

(56) References Cited

U.S. PATENT DOCUMENTS

| | | | |
|---|---|---|---|
| 3,333,743 A | 8/1967 | Charles | |
| 3,786,967 A * | 1/1974 | Giocomo | B65D 83/38 222/397 |
| 3,850,339 A * | 11/1974 | Kinkel | B65D 83/70 220/89.2 |
| 3,912,130 A * | 10/1975 | Pelton | B65D 83/70 222/396 |
| 5,038,952 A * | 8/1991 | Dorfman | B65D 41/10 215/324 |
| 8,960,503 B2 * | 2/2015 | Soliman | B65D 83/38 222/402.1 |
| 9,296,550 B2 | 3/2016 | Smith | |
| 9,334,103 B2 * | 5/2016 | Soliman | B65D 83/38 |
| 9,758,294 B2 | 9/2017 | Mcdaniel | |
| 9,987,387 B2 | 6/2018 | Nguyen | |
| 2009/0014679 A1 | 1/2009 | Hygema et al. | |
| 2010/0133295 A1 | 6/2010 | Chan | |
| 2010/0133301 A1 | 6/2010 | Chan | |
| 2012/0291911 A1 | 11/2012 | Smith | |
| 2012/0291912 A1 | 11/2012 | Smith | |
| 2012/0292338 A1 | 11/2012 | Smith | |
| 2014/0361038 A1 * | 12/2014 | Mekata | B65D 83/62 222/95 |
| 2018/0155115 A1 | 6/2018 | Wolak | |
| 2019/0135532 A1 | 5/2019 | Franckhauser | |

FOREIGN PATENT DOCUMENTS

| | | |
|---|---|---|
| JP | 2006176131 A | 7/2006 |
| JP | 2013249073 A | 12/2013 |
| WO | WO2018102481 A1 | 6/2018 |
| WO | WO2018102482 A1 | 6/2018 |

* cited by examiner

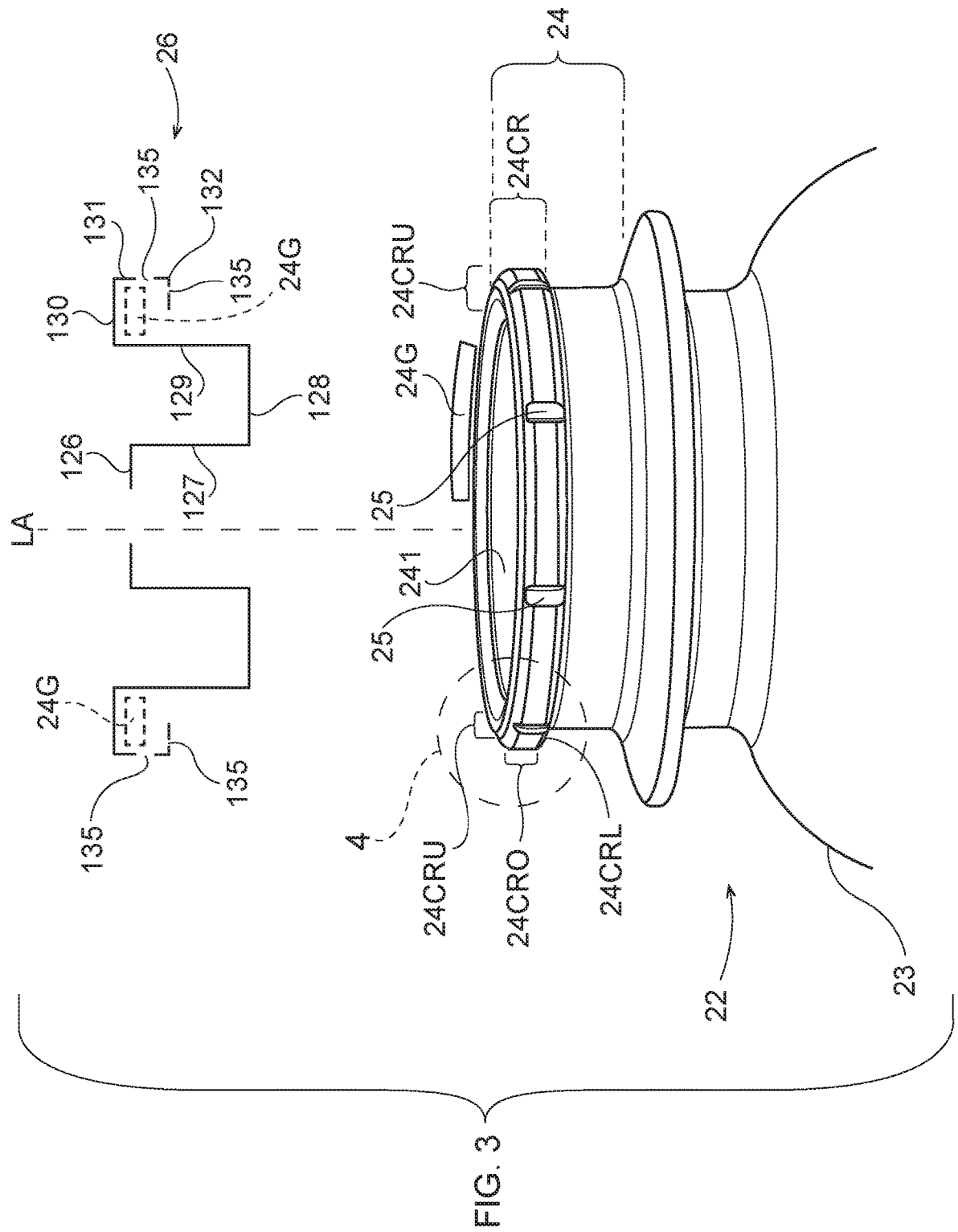

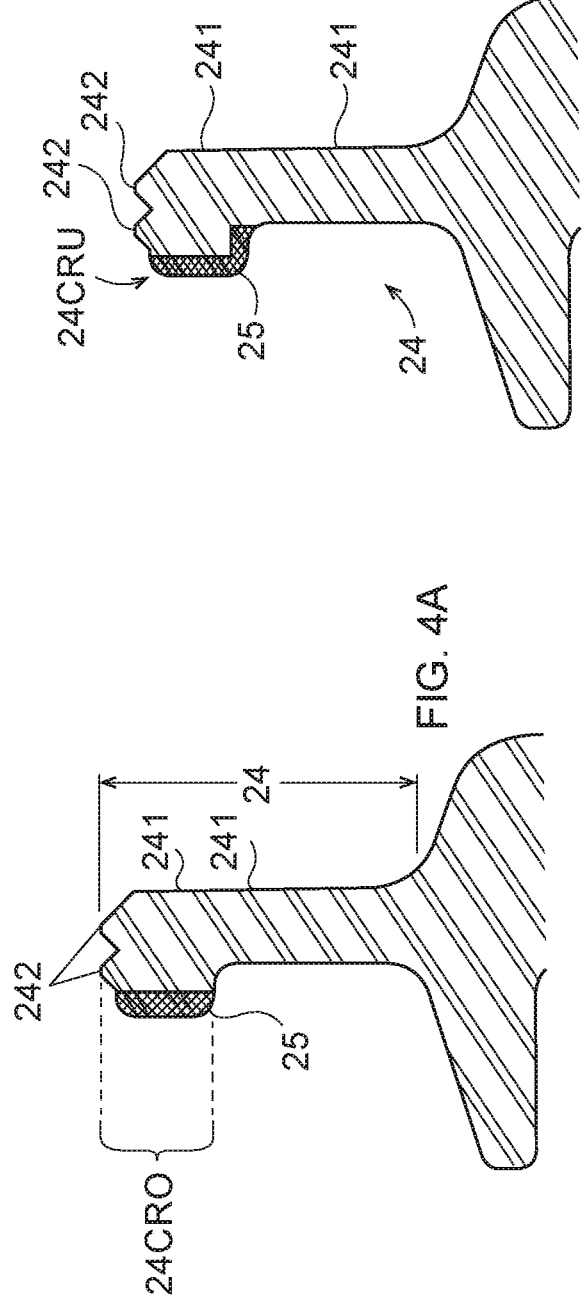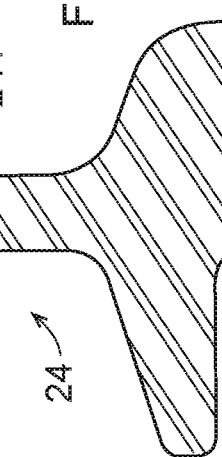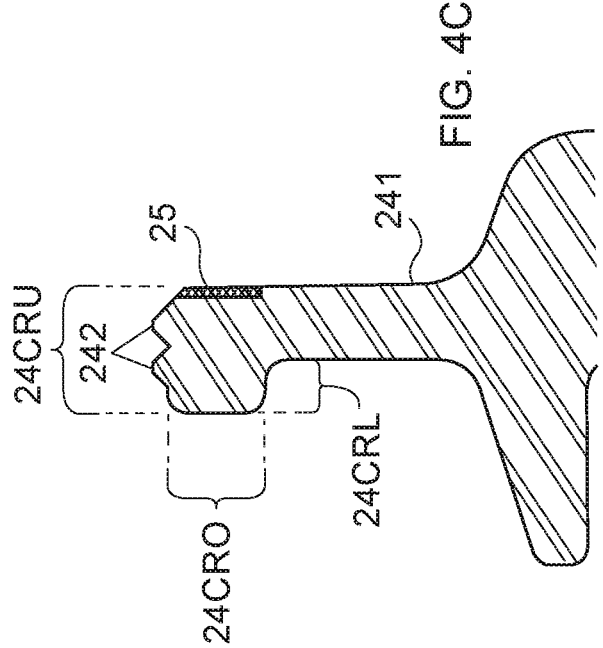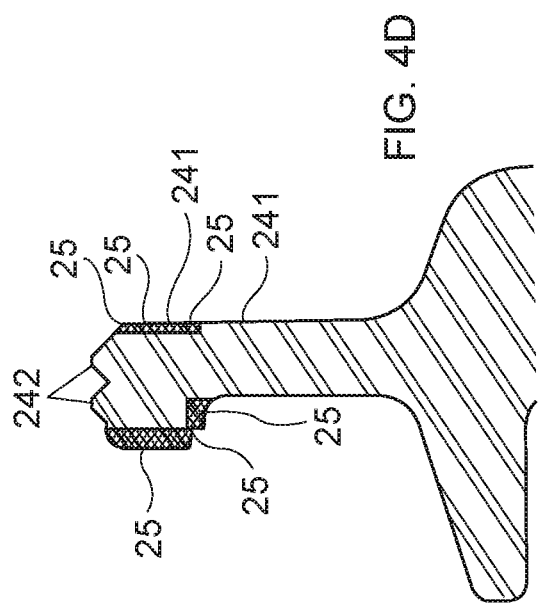

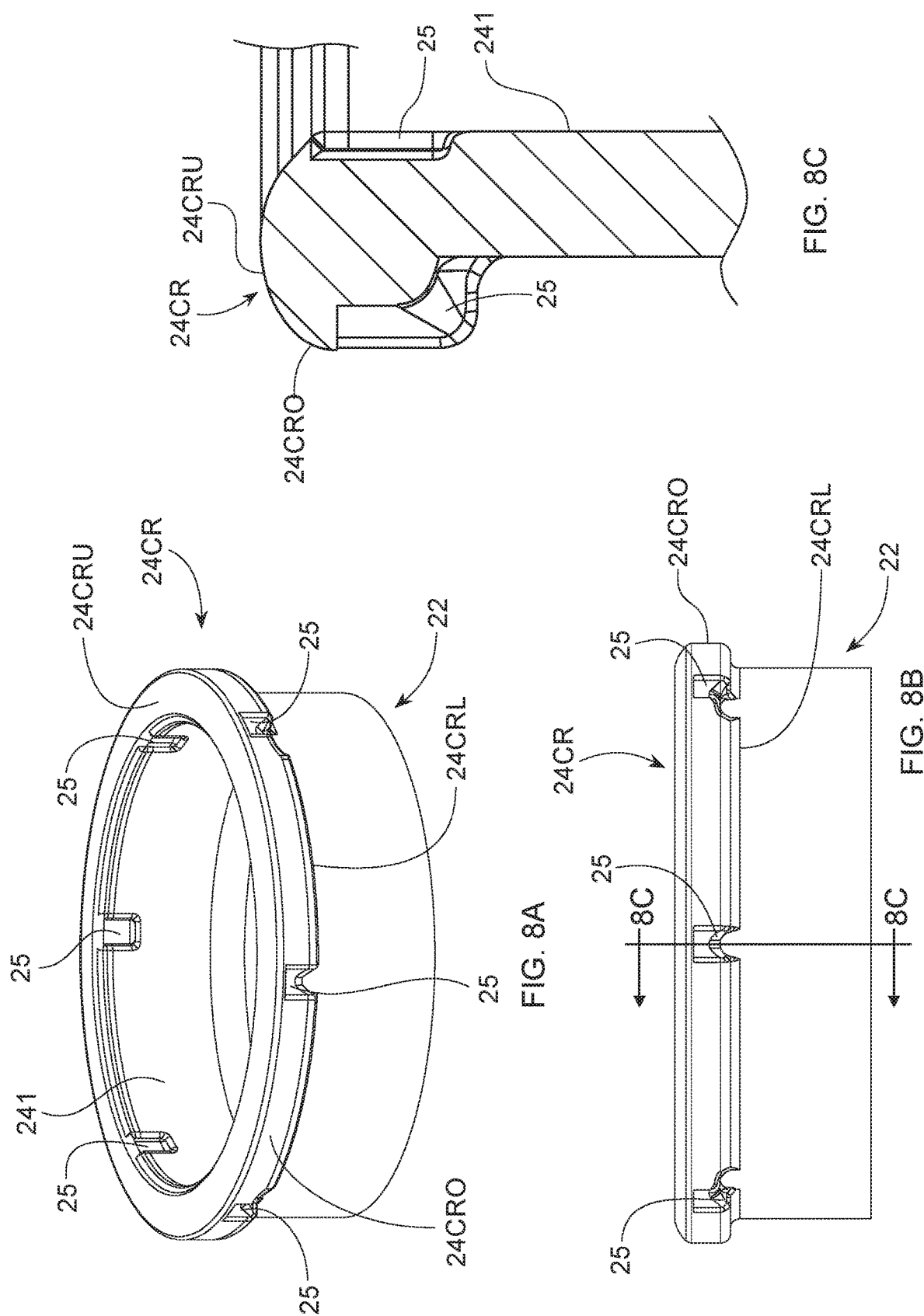

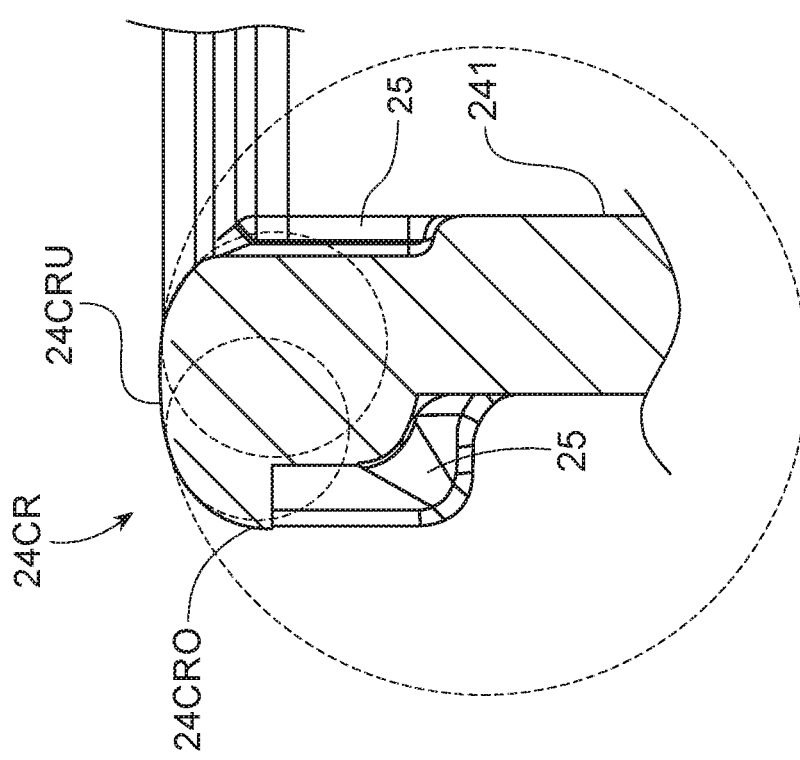
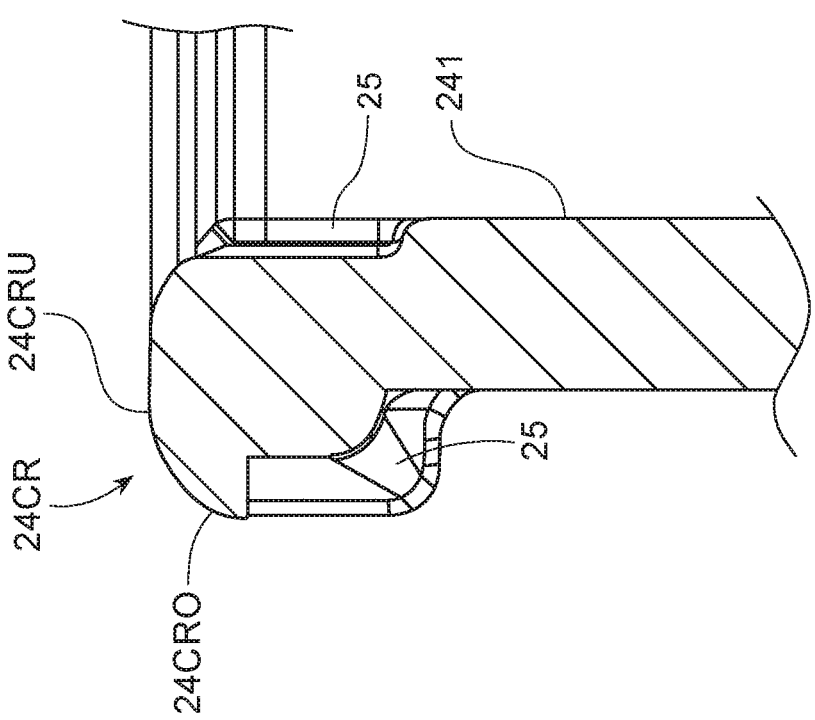

AEROSOL DISPENSER

FIELD

The present disclosure is directed to an aerosol dispenser, and, more particularly, to an aerosol dispenser that maintains a relatively robust seal at elevated temperatures and safely and effectively addresses overpressurization at excessive temperatures.

BACKGROUND

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 9,296,550; 9,334,103 and 2009/0014679. Aerosol dispensers made from plastic or at least partially made from plastic may be advantageous due to cheaper manufacturing costs, recyclability, and greater versatility in design, for example.

However, plastic components are more susceptible to elevated temperatures. Aerosol dispensers have typically been used to dispense products which can be used independent of the product temperature. For example, aerosol dispensers are commonly used to dispense cleaning products, insecticide, air fresheners, shaving cream, etc. These products are ubiquitously dispensed at the temperature ambient to the aerosol dispenser, typically room temperature.

However, room temperature may not be optimum for all products. Some products may be more optimally used in a warmed or heated condition, the terms being used interchangeably, and, thus, may undergo intentional heating. For example, certain foods are more palatable when served warm. Air freshener may disperse better when warmed. Shaving cream may be perceived to be more comfortable when warmed.

Additionally, some products may be inadvertently heated when left unattended in relatively hot environments. For example, aerosol dispensers are shipped and, thus, may be subject to shipping containers having relatively elevated temperatures or excessive temperatures. Further, some aerosol dispensers contain products which consumers carry with them and, thus, may be left unattended in environments with elevated temperatures or excessive temperatures, such as automobiles.

Overpressurization and deformation may occur during heating, either intentionally or inadvertently, of an aerosol dispenser. This overpressurization and deformation may result in rupture of the aerosol dispenser and/or premature loss of propellant and/or product. Attempts have been made to address this potentially hazardous situation of having the aerosol dispenser rupture by controlling the dispenser itself, such as by selection of specific materials and shapes of components, and/or the loss of propellant and/or product. However, these attempts have been unsuccessful at maintaining a seal with little or no leakage at elevated temperatures and safely and effectively mitigating hazardous situations at excessive temperatures.

Accordingly, it is an object of this invention to provide an aerosol dispenser that addresses the occurrence of rupture in the event of overpressurization and better controls the release of propellant and/or product.

SUMMARY

In some embodiments, a preform for use in an outer container of an aerosol dispenser may include a crimp ring defining an open top and extending about a longitudinal axis. The preform may also include a closed end bottom opposite the open top and a sidewall extending between the crimp ring and the closed end bottom. The crimp ring may include an upper surface and a lower surface opposite the upper surface. The upper surface and the lower surface may be joined by an outer surface, and the upper surface may be a substantially planar surface. The crimp ring may also include an inside diameter surface opposite the outer surface, and at least one of the outer surface and the inner surface of the crimp ring may include a vent.

In some embodiments, an outer container for use in an aerosol dispenser may include a crimp ring defining an open top and extending about a longitudinal axis. The outer container may include a lower neck portion adjacent the crimp ring and a sidewall extending between the lower neck portion to a closed end bottom. The crimp ring includes an upper surface and a lower surface opposite the upper surface. The upper surface and the lower surface may be joined by an outer surface. The upper surface may be a substantially planar surface. The crimp ring may also include an inside diameter surface opposite the outer surface, and at least one of the inner surface and the outer surface of the crimp ring may include a vent.

In some embodiments, an aerosol dispenser for dispensing a product may include an outer container defining an open top and having a bottom opposite the open top. The dispenser may also include: a crimp ring extending about the open top of the outer container a; a sidewall extending between the crimp ring and the bottom of the outer container; a valve cup joined to the crimp ring; a valve joined to the valve cup for dispensing product from the outer container; and propellant disposed in the outer container. The crimp ring may include an upper surface and a lower surface opposite the upper surface. The upper surface and the lower surface may be joined by an outer surface, and the upper surface may be a substantially planar surface. The crimp ring may also include an inside diameter surface opposite to the outer surface. At least one of the inner diameter surface and the outer surface of the crimp ring may include a vent.

In some embodiments, a preform for use in an outer container of an aerosol dispenser may include a crimp ring defining an open top and extending about a longitudinal axis. The preform may also include a closed end bottom opposite the open top and a sidewall extending between the crimp ring and the closed end bottom. The crimp ring may include an upper surface and a lower surface opposite the upper surface. The upper surface and the lower surface may be joined by an outer surface, and the upper surface may be a continuous convex surface. The crimp ring may also include an inside diameter surface opposite the outer surface, and at least one of the outer surface and the inner surface of the crimp ring may include a vent.

In some embodiments, an outer container for use in an aerosol dispenser may include a crimp ring defining an open top and extending about a longitudinal axis. The dispenser may also include a lower neck portion adjacent the crimp ring and a sidewall extending between the lower neck portion to a closed end bottom. The crimp ring may include an upper surface and a lower surface opposite the upper surface. The upper surface and the lower surface may be joined by an outer surface, and the upper surface may be a continuous convex surface. The crimp ring may also include an inside diameter surface opposite the outer surface, and at least one of the inner surface and the outer surface of the crimp ring may include a vent.

In some embodiments, an aerosol dispenser for dispensing a product may include an outer container defining an open top and having a bottom opposite the open top. The dispenser may also include: a crimp ring extending about the open top of the outer container; a sidewall extending between the crimp ring and the bottom of the outer container; a valve cup joined to the crimp ring; a valve joined to the valve cup for dispensing product from the outer container; and propellant disposed in the outer container. The crimp ring may include an upper surface and a lower surface opposite the upper surface. The upper surface and the lower surface may be joined by an outer surface, and the upper surface may be a continuous convex surface. The crimp ring may also include an inside diameter surface opposite to the outer surface, and at least one of the inner diameter surface and the outer surface of the crimp ring may include a vent.

In some embodiments, a preform for use in an outer container of an aerosol dispenser may include a crimp ring defining an open top and extending about a longitudinal axis. The dispenser may also include a closed end bottom opposite the open top and a sidewall extending between the crimp ring and the closed end bottom. The crimp ring includes an upper surface and a lower surface opposite the upper surface. The upper surface and the lower surface may be joined by an outer surface. The crimp ring may also include an inside diameter surface opposite the outer surface. The outer surface of the crimp ring may include a vent extending from the lower surface through a portion of the outer surface.

In some embodiments, an outer container for use in an aerosol dispenser may include a crimp ring defining an open top and extending about a longitudinal axis. The outer container may also include a lower neck portion adjacent the crimp ring and a sidewall extending between the lower neck portion to a closed end bottom. The crimp ring may include an upper surface and a lower surface opposite the upper surface. The upper surface and the lower surface may be joined by an outer surface. The crimp ring may also include an inside diameter surface opposite the outer surface. The outer surface of the crimp ring may include a vent extending from the lower surface through a portion of the outer surface.

In some embodiments, an aerosol dispenser for dispensing a product may include an outer container defining an open top and having a bottom opposite the open top. The dispenser may also include: a crimp ring extending about the open top of the outer container; a sidewall extending between the crimp ring and the bottom of the outer container; a valve cup joined to the crimp ring; a valve joined to the valve cup for dispensing product from the outer container; and propellant disposed in the outer container. The crimp ring may include an upper surface and a lower surface opposite the upper surface. The upper surface and the lower surface may be joined by an outer surface. The crimp ring may also include an inside diameter surface opposite to the outer surface. The outer surface of the crimp ring may include a vent extending from the lower surface through a portion of the outer surface.

BRIEF DESCRIPTION OF THE DRAWINGS

FIG. 3 is a partial perspective view of an outer container for the aerosol dispenser having a fragmentary exploded gasket and an exploded sectional valve cup, the gasket being shown in phantom in position in the valve cup.

FIG. 4A is a partial detailed view taken from FIG. 3 of a crimp ring having axial vents on the outer surface.

FIG. 4B is a partial detailed view taken from FIG. 3 of a crimp ring having axial vents on the inner surface.

FIG. 4C a partial detailed view taken from FIG. 3 of a crimp ring having axial vents on the outer surface and lower surface.

FIG. 4D is a partial detailed view taken from FIG. 3 of a crimp ring having axial vents on the outer surface, radial vents on the lower surface lower surface and inner surface, and further having a circumferential vent bridging the axial and radial vents, respectively vents on both the outer surface and lower surface and a circumferential vent bridging the axial vents on the inner surface.

FIG. 8A is a perspective view of a crimp ring including vents.

FIG. 8B is a side view of a crimp ring including vents.

FIG. 8C is a partial sectional view taken along lines 8C-8C of FIG. 8B of the crimp ring.

FIG. 9A is a partial sectional view of the crimp ring including a continuous convex surface.

FIG. 9B is a partial sectional view of the crimp ring including a continuous convex surface.

DETAILED DESCRIPTION

Figure 1:
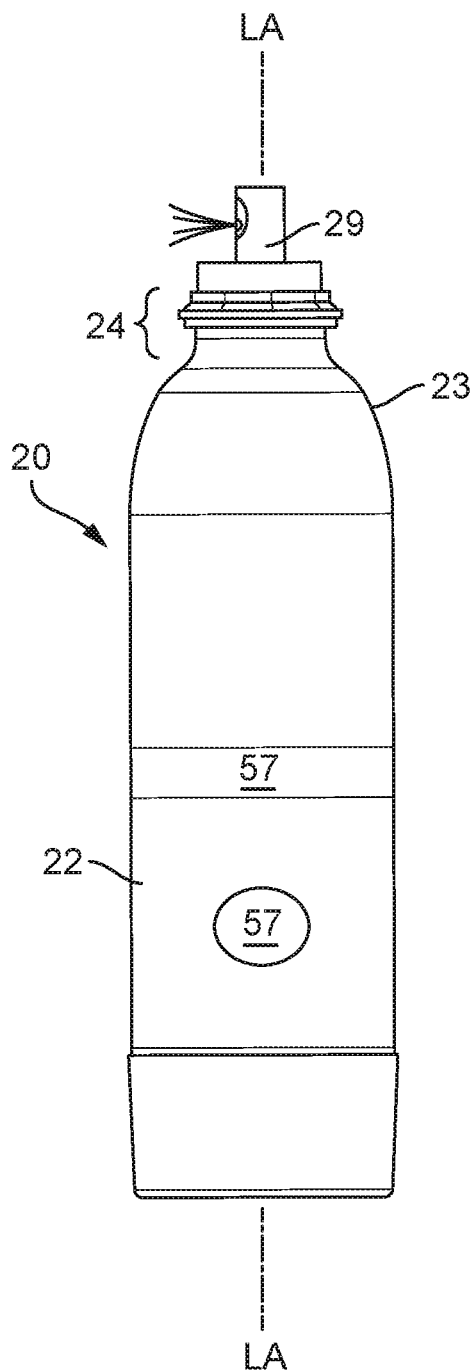
FIG. 1 is a side elevational view of an aerosol dispenser.

Referring to FIG. 1, an aerosol dispenser 20 is shown. The aerosol dispenser 20 comprises a pressurizeable outer container 22 usable for such a dispenser. The outer container 22 may comprise plastic or metal, as are known in the art. The outer container 22 has both product 40 and propellant 42 disposed therein.

The outer container 22 has an opening with a valve cup 26 therein. A user activated dispensing valve may be disposed in the valve cup 26. A product delivery device may be joined to the valve cup 26. Propellant 40 may be disposed between the outer container 22 and the product delivery device. The product 42 and propellant 40 may be separately dispensed or may be dispensed together.

The aerosol dispensers 20, and components thereof, may have a longitudinal axis LA, and may optionally be axisymmetric with a round cross section. Alternatively, the outer container 22 may be eccentric and have a square, elliptical or other cross section.

The outer container 22 may have a neck 24 that defines an opening. The opening may be at the top of the pressurizeable container 22 when the pressurizeable container 22 is in its-in use position. Other components may be sealed to the neck 24. The neck 24 has a perimeter 24P, which defines the outside of the neck 24. The perimeter 24P of the neck 24 has at least one vent 25.

The neck 24 may include a crimp ring 24CR. The next may include an upper portion and a lower portion. The crimp ring 24CR may be disposed about the upper portion of the neck. A portion of the crimp ring 24CR may extend radially outwardly from a portion of the neck 24. A metal valve cup 26 may be clinched to the crimp ring 24CR. A gasket 24G may be disposed between the top of the crimp ring 24CR and the valve cup 26.

The valve cup 26 may be integral and formed from a single piece of metal comprising plural contiguous and annular walls. Alternatively, the valve cup 26 may comprise plastic, or any material suitable for forming around or welding to the crimp ring 24CR. Each wall of the valve cup 26 has opposed inner and outer surfaces, the inner surfaces generally facing downward or towards the longitudinal axis LA.

Referring to FIGS. 1 and 3, the valve cup 26 may have a center hole, to allow for a valve stem to longitudinally move therethrough. Radially outward from and adjacent the hole may be an annular platform 126. Adjacent, radially outward from and contiguous the platform 126 may be an annular inner skirt wall 127. Adjacent, radially outward from and contiguous the inner skirt wall 127 may be an annular bottom wall 128. Adjacent, radially outward from and contiguous the bottom wall 128 may be an annular outer skirt wall 129.

The outer skirt wall 129 may be spaced away from the inside diameter surface 241 of the neck 24 to allow for ease of assembly. Adjacent, radially outward from and contiguous the outer skirt wall 129 may be an annular top wall 130. The inner surface of the top wall 130 may seal against the gasket 24G. Adjacent, radially outward from and contiguous the top wall 130 may be an annular outer wall 131. The inner surface of the outer wall 131 may seal against the outer surface 24CRO of the crimp ring 24CR. Adjacent, radially outward from and contiguous the outer wall 129 may be an annular bottom wall 132. The bottom wall 132 may engage the lower surface 24CRL of the crimp ring 24CR to clamp the valve cup 26 in place. The walls 126, 127, 128, 129, 130, 131, 132 are shown in concentric, parallel, and orthogonal relationships, although, it is to be appreciated that any suitable angular relationship may be used.

The annular outer wall 131 may be perforate. By perforate it is meant that the outer wall 131 is gas permeable. Gas permeability may be attained by one or more circumferentially spaced holes 135 through the outer wall 131. The holes 135 allow for exhausting of propellant 40 and/or product 42 therethrough which escapes past the gasket 24G to ambient.

The holes 135 may be longitudinally centered or intercept the bottom wall 132. The holes 135 may be equally or unequally sized, equally or unequally circumferentially spaced, and equally or unequally longitudinally disposed. For the system described herein, three to 15 spaced holes 135, having a diameter of 0.3 mm to 1 mm are believed to be suitable and particularly four holes equally spaced at 90 degrees and having a diameter of 0.8 mm is believed suitable.

Recycling class 1 thermoplastic elastomer [TPE] may be selected for the gasket 24G. The TPE material may be selected to be resistant to the propellant 40 and/or product 42 desired for use. A hydrophilic TPE-E based compound formulated to provide adhesion to PET and chemical resistance to silicone oil may be used as one or more components in the aerosol dispenser 20. Class 1 TPE material sold by Kraiburg TPE GmbH & Co KG of Waldkraiburg, Germany under the name Hcc8791-52 may be suitable.

A dispensing valve, in turn, may be disposed within the valve cup 26. The dispensing valve provides for retention of product 42 within the aerosol dispenser 20 until the product 42 is selectively dispensed by a user. The product 42 may be dispensed through a dip tube 56 or from a bag 55, as is known in the art. The dispensing valve may be selectively actuated by an actuator 29. Selective actuation of the dispensing valve allows the user to dispense a desired quantity of the product 42 on demand. Illustrative and nonlimiting products 42 for use with the dispenser may include shave cream, shave foam, body sprays, body washes, perfumes, cleansers, air fresheners, astringents, foods, paints, etc.

Figure 2A:
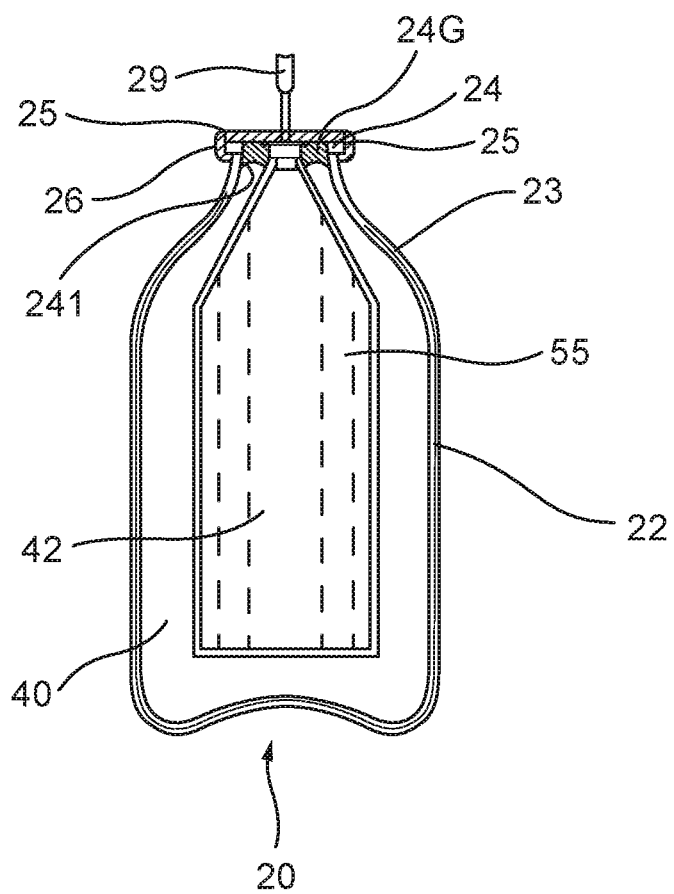
FIG. 2A is a side elevational sectional view of an aerosol dispenser having a collapsible bag.
Figure 2B:
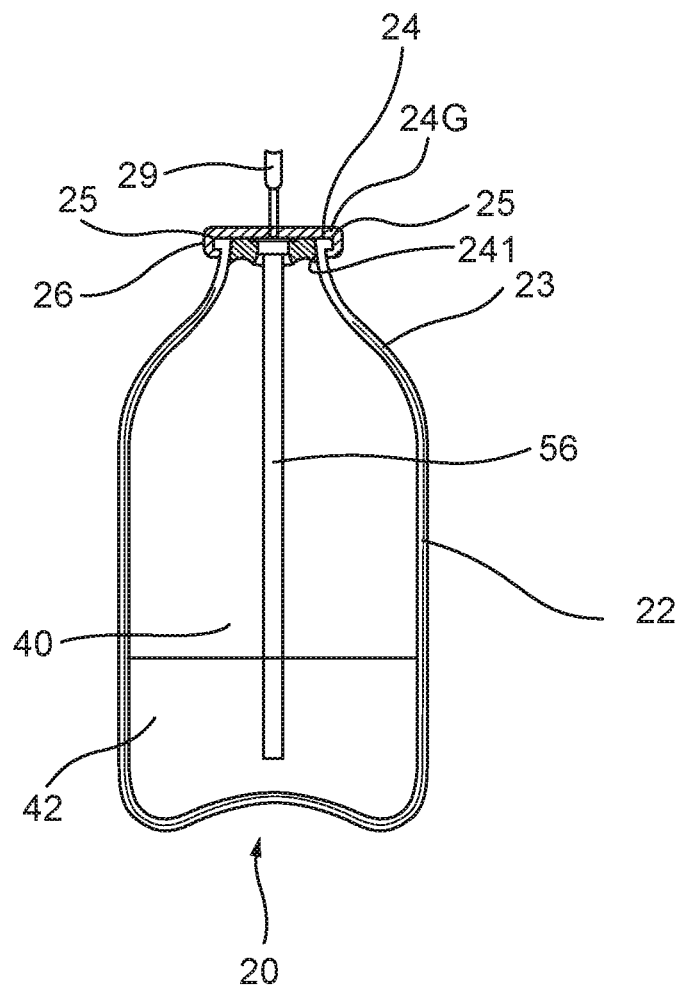
FIG. 2B is a side elevational sectional view an aerosol dispenser having a dip tube.

Referring to FIGS. 2A and 2B, inside the outer container 22 may be a product delivery device. The product delivery device may comprise a collapsible bag 55 as shown in FIG. 2A. The collapsible bag 55 may be mounted in sealing relationship to the neck 24 of the container and/or to the dispensing valve. This arrangement may be referred to as a bag-on-valve. The collapsible bag 55 may hold product 42 therein and prevent intermixing of the product 42 with the propellant 40. The propellant 40 may be stored outside the collapsible bag 55, and inside the outer container 22. The collapsible bag 55 may expand upon being charged with product 42. Such expansion decreases the available volume inside the outer container 22. Decreasing the available volume increases the pressure of any propellant 40 therein according to Boyles law.

The product delivery device may alternatively or additionally comprise a dip tube 56 as shown in FIG. 2B. The dip tube 56 may extend from a proximal end sealed to the dispensing valve. The dip tube 56 may terminate at a distal end juxtaposed with the bottom of the outer container 22. This embodiment provides for intermixing of the product 42 and propellant 40. The product 42 and the propellant 40 may be co-dispensed in response to selective actuation of the dispensing valve by a user. Again, insertion of product 42 and/or propellant 40 into the outer container 22 increases pressure therein according to Boyles law.

The outer container 22 may comprise a plastic pressurizeable container. The plastic may be polymeric. For example, the plastic pressurizeable container may include PET. The dispensing valve, and optional valve cup 26 may be joined, such as by welding, to the neck 24 of the outer container 22, as discussed below. The valve cup 26 may be clinched to the neck 24. Any number of known valve assemblies may be usable with the dispenser. One suitable and non-limiting example, is shown. A suitable dispensing valve may be made as described in US Patent Publication Nos. 2010/0133301A1 and 2010/0133295A1.

The pressurizeable container may further include a propellant 40. The propellant 40 may be disposed in the outer container 22. The propellant 40 may be disposed in the outer container 22 and/or the collapsible bag 55. The pressure in the outer container 22 may be greater than the pressure in the collapsible bag 55, so that product 42 may be dispensed from within the bag. If a dip tube 56 is selected for the product delivery device, the propellant 40 and product 42 may be intermixed, and thus co-dispensed. The pressure of the propellant 40 within the outer container 22 provides for dispensing of the product 42/co-dispensing of product 42/propellant 40 to ambient, and optionally to a target surface. The target surface may include a surface to be cleaned or otherwise treated by the product 42, skin, etc. Such dispensing occurs in response to the user actuating the dispensing valve.

Examining the components in more detail, the product delivery device may include a flexible, collapsible bag 55. The pressure boundary for the propellant 40 is formed, in part, by the collapsible bag 55. Or the product delivery device may comprise a dip tube 56. In either embodiment, the pressure boundary for the propellant 40 is formed, in part by the underside of the dispensing valve when the valve is closed.

The outer container 22, dispensing valve, dip tube 56 and/or collapsible bag 55 may be polymeric. By polymeric it is meant that the component comprises polymers, such as polyolefin, polyester, or nylon. Thus, the entire aerosol dispenser 20 or, specific components thereof, may be free of metal. The valve cup 26 may comprise ductile and formable metal such as low carbon steel or aluminum. The valve cup 26 may be stamped and clinched in known fashion.

The outer container 22, collapsible bag 55, and/or dip tube 56, may be transparent or substantially transparent. If both the outer container 22 and a collapsible bag 55 used as the product delivery device are transparent, this arrangement provides the benefit that the consumer knows when product 42 is nearing depletion and allows improved communication of product 42 attributes, such as color, viscosity, etc. Also, labeling or other decoration 57 of the container 22 may be more apparent if the background to which such decoration is applied is transparent or substantially transparent. Alternatively or additionally, the outer container 22, collapsible bag 55, etc. may be colored with like or different colors.

The outer container 22 may define a longitudinal axis LA of the aerosol dispenser 20. The outer container 22 may be axisymmetric as shown, or, may be eccentric. While a round cross-section is shown, it is to be appreciated that other non-round cross-sections may be used. The cross-section may be square, elliptical, irregular, etc. Furthermore, the cross section may be generally constant as shown, or may be variable. If a variable cross-section is selected, the outer container 22 may be, for example, barrel shaped, hourglass shaped, or monotonically tapered.

The outer container 22 may range from 6 to 40 cm in height, taken in the axial direction and from 4 to 60 cm in diameter if a round footprint is selected. The outer container 22 may have a volume ranging from 50 or 115 cc to 1000 cc exclusive of any components therein, such as a product delivery device. The outer container 22 may be injection stretch blow molded. The injection stretch blow molding process may provide a stretch ratio of greater than 8, 8.5, 9, 9.5, 10, 12, 15 or 20.

The outer container 22 may sit on a base. The base is disposed on the bottom of the outer container 22 and of the aerosol dispenser 20. Suitable bases include petaloid bases, champagne bases, hemispherical or other convex bases used in conjunction with a base cup. Or the outer container 22 may have a flat base with an optional push-up. A push-up is a concavity in the bottom of the container and extending towards the neck 24 of the container. A push-up is distinguishable from a general concavity in the bottom of a container, as a push-up has a smaller diameter than is defined by the footprint of the bottom of the container. The push-up may be axisymmetric about the longitudinal axis LA. The vertex of the push-up may be coincident the longitudinal axis LA. The outer container 22 sidewall also defines a diameter.

The outer container 22 may be pressurized to an internal gage pressure of 100 to 970, 110 to 490 or 270 to 420 kPa. The aerosol dispenser 20, as presented to a user may have an initial pressure. The initial pressure is the highest pressure encountered for a particular filling operation and corresponds to no product 42 yet being dispensed from the product delivery device. As product 42 is depleted, the outer container 22 approaches a final pressure. The final pressure corresponds to depletion of substantially all product 42, except for small residual, from the product delivery device. For example, a particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, etc. The propellant 40 pressurizes the product 42 to a pressure greater than ambient, to provide for delivery from the aerosol dispenser 20.

The outer container 22, and all other components, except the TPE gasket 24G, and valve cup 26 may comprise, consist essentially of or consist of PET, PEN, Nylon EVOH or blends thereof to meet DOT SP 14223. Such materials may be recyclable or selected so that the finished container may be recycled in a single steam, such as discussed in U.S. patent application Ser. No. 16/120,493.

The neck 24 may be connected to the container sidewall by a shoulder 23. The shoulder 23 may be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

In some embodiments, the propellant 40 may comprise nitrogen, air, and mixtures thereof. Propellant 40 listed in the US Federal Register 49 CFR 1.73.115, Class 2, Division 2.2 are also considered acceptable. The propellant 40 may comprise a hydrofluoroolefin, a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or GWP-6. In some embodiments, the propellant 40 may comprise another hydrofluoroolefin, a trans-1-chloro-3,3,3-trifluoropropene, and optionally a CAS number 102687-65-0. One such propellant 40 is commercially available from Honeywell International of Morristown, N.J. under the trade name Solstice® Performance Fluid (PF). The propellant 40 may be comprised of a single chemical component or from a blend of one or more components to create the desired physical properties for the aerosol dispenser. An example would be a physical blend of the HFO1234ze with the Solstice PF (HFO ZE/PF) in a 70:30 ratio by weight. The propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user. A condensable propellant 40 provides the benefit of a flatter depressurization curve as product 42 is depleted during usage. A condensable propellant 40 provides the benefit that a greater volume of gas may be placed into the container at a given pressure. Upon dispensing of a sufficient volume of product 42 from the space between the outer container 22 and the product delivery device, the condensable propellant 40 may flash back to a gaseous state of matter.

The pressurizeable container 22 may be charged with an amount of product 42 which brings the pressure, as initially presented to the user, sufficient to dispense and substantially deplete the product 42 from the aerosol dispenser 20. The final pressure, after substantially all product 42 is depleted, may be less than the initial pressure.

Product 42 may be charged into the container through the dispensing valve. When product 42 is charged into the container, the product 42 increases the pressure of the propellant 40. The increase in propellant 40 pressure occurs due to the increase in volume of the collapsible bag 55 if such a bag 55 is used as a product delivery device. Likewise, the increase in propellant 40 pressure occurs due to the increase in the number of moles of product 42 in the outer container 22 if a dip tube 56 is selected. An aerosol dispenser 20 may be made as described in US Patent Publication Nos. 2012/0292338A1; 2012/0291911A1; and 2012/0291912A1.

Referring to FIG. 3, the outer container 22 may have a round crimp ring 24CR with an inner diameter oriented towards the longitudinal centerline LA and an outer diameter opposed thereto. The crimp ring 24CR may be thought of as having three conjoined surfaces, an upper surface 24CRU, a lower surface 24CRL opposed thereto, and an outer surface 24CRO joining the upper surface 24CRU and lower surface 24CRL. The three surfaces 24CRU, 24CRL, and 24CRO are shown in parallel and orthogonal relationships, although, it is to be appreciated that any suitable angular relationship may be used.

Referring to FIGS. 4A-4D, the outer surface 24CRO of the crimp ring 24CR may have at least one vent 25. The vent 25 comprises a channel through the outer surface 24CRO and between the outer surface 24CRO and the valve cup 26. The vent 25 may extend throughout the entire length of the outer surface 24CRO. This arrangement provides for controlled release of pressure should overpresurization occur. More specifically, upon over pressurization, the neck 24 may bulge to a barrel shape, causing the upper surface 24CRU to deform, such as by rotating inwardly toward the longitudinal axis. Propellant 42 and/or product 40 may then leak past the gasket 24G and be exhausted to ambient outwardly through the vents 25.

In some embodiments, a plurality of vents 25 may be circumferentially spaced about the perimeter of the outer surface 24CRO and may be used to provide adequate flow area for the exhaust. In some embodiments, the vents 25 may be equally spaced about the outer surface 24CRO. Circumferential spacing of the vents 25 allows for exhaust in the event deformation of the neck 24 is eccentric or occurs unevenly. Providing a path for propellant and/or product to be released allows for the dispenser to safely depressurize.

In some embodiments, vents 25 may also be disposed on the lower surface 24CRL of the crimp ring 24CR. These vents 25 may be aligned with the vents 25 on the outer surface 24CRO of the crimp ring 24CR. The vents 25 may extend through the entire length of the lower surface 24CRL to provide for adequate venting. These additional and optional vents 25 provide for venting between the lower surface 24CRL and the valve cup 26.

In some embodiments, vents 25 may also be placed on the inside diameter surface 241 of the neck 24 or crimp ring 24CR. Such vents 25 may extend in the longitudinal direction to at least the bottom of the valve cup 26 which may be positioned adjacent the inside diameter surface 241 of the neck 24. These vents 25 may not extend to the shoulder 23 or the bottom of the neck 24 for strength. These additional and optional vents 25 provide for venting between the inside of the neck 24 and the valve cup 26.

For any of the aforementioned surfaces, i.e. the inner diameter of the neck 24, the upper surface 24CRU of the crimp ring 24CR, and lower surface 24CRL of the crimp ring 24CR, one, two, or at least three spaced vents 25 may be used. In some embodiments, there may be from about six vents 25 to about 12 vents 25. The vents 25 may be of constant cross section or variable cross section. The vents 25 may be of equal or unequal size, geometry, and flow area. The vents 25 may be equally or unequally circumferentially spaced. The vents 25 may have any suitable cross section and hydraulic radius that allows for a path for propellant and/or product to exit when the dispenser becomes overpressurized. For example, for a crimp ring 24CR having an outer radius of 32 mm, and an aerosol dispenser 20 having typical internal pressures, eight equally spaced vents 25, each having a radial depth of 0.8 millimeters may be used. The vents 25 disposed on the outer surface 24CRO may be radially offset from the vents 25 disposed on the inner diameter surface 241. The offset design allows for a greater surface area between the vents disposed on the outer surface 24CRO and the vents disposed on the inner diameter surface 241. The increase in surface area between vents may provide for a relatively more robust seal.

Referring particularly to FIG. 4D, optionally a circumferential vent 25 may connect the axial vents 25 on the outer surface 24CRU, the axial vents 25 on the inside diameter surface 241 of the crimp ring 24CRU, or the radial vents on the lower surface 24CRU. Such a circumferential vent prophetically allows cross communication between the aforementioned axial and radial vents.

Referring generally to FIGS. 4A-4D the vents 25 on the inner diameter of the neck 24 and outer surface 24CRO may be axially parallel or skewed relative to the longitudinal axis LA. The vents 25 on the lower surface 25CRL may be radially oriented, or radially skewed, such as spirally oriented.

Figure 5A:
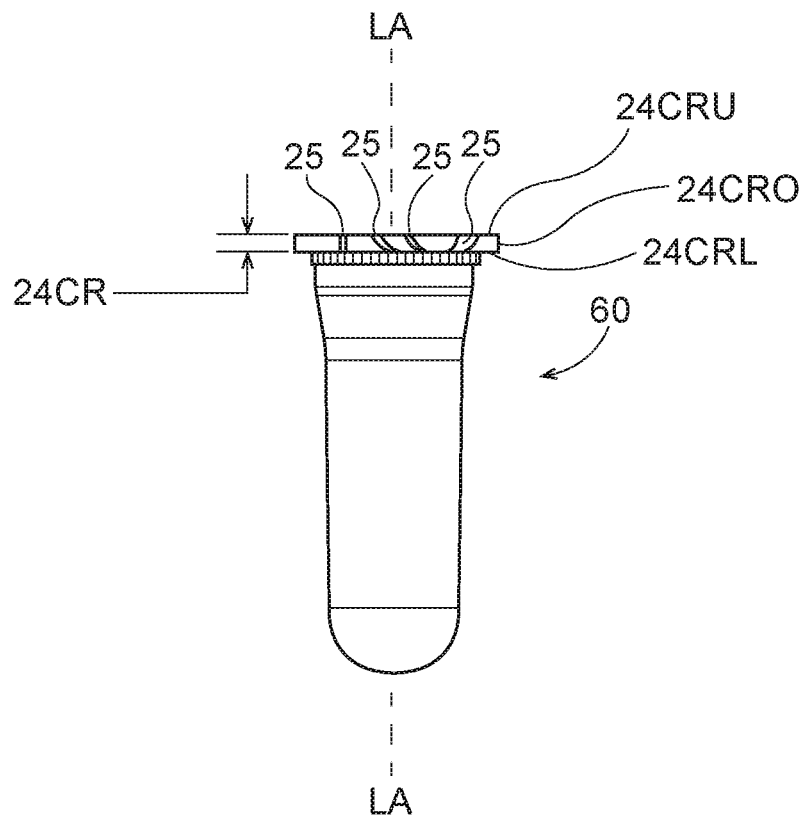
FIG. 5A is a side view of a preform for the outer container having irregularly shaped and irregularly spaced vents.
Figure 5B:
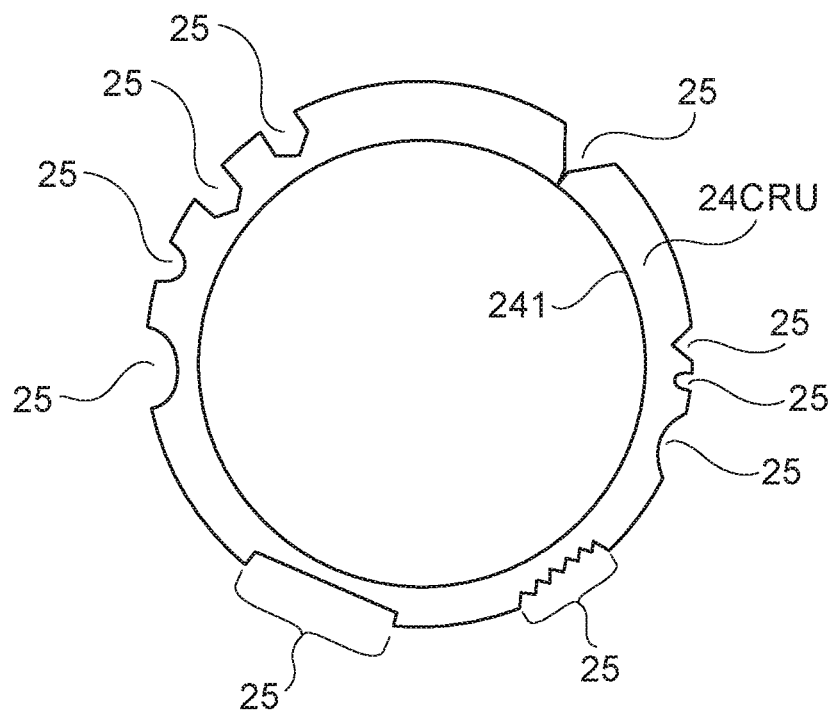
FIG. 5B is a top plan view of a preform for the outer container having irregularly shaped and irregularly spaced vents.

Referring to FIGS. 5A-5B, any of the aforementioned vents 25 may be incorporated into the preform 60. The preform 60 having the vents 25 is blown into an outer container 22, such as by using known ISBM techniques. This arrangement provides the benefit that the vents 25 are present without additional steps or complexity being required during manufacture. The vents 25 may be machined into the crimp ring 24CR using known techniques. For example, the vents 25 may be injection molded into the crimp ring 24C, or the vents 25 may be molded into the preform 22P, which is later molded into the outer container 22, using known ISBM techniques.

It is to be appreciated that the one or more vents 25 may be disposed on any one of the outer surface 24CRO, inner diameter surface 241, and lower surface 24CRL. Further, the one or more vents 25 may be disposed on any two of the outer surface 24CRO, inner diameter surface 241 and lower surface 24CRL without limitation and in any combination thereof. Further still, the one or more vents 25 may be disposed on all three of the outer surface 24CRO, inner diameter surface 241, and lower surface 24CRL.

Traditionally, the upper surface 24CRU of the crimp ring 24CR has included two annular beads 242. It is believed that these two annular beads 242 aid in maintaining a seal between the gasket 24G and the crimp ring 24CR. An example embodiment of these annular beads 242 are illustrated in FIGS. 4A-4D. Further, the vents 25, as illustrated in FIGS. 4A-4C are designed such that the vent 25 does not interfere with the annular beads 242. The vent 25 may disposed on the outer surface 24CRO of the crimp ring 24CR and extend from the upper surface 24CRU to the lower surface 24CRL.

As previously discussed, dispensers may undergo inadvertent or intentional heating. Having a dispenser that is made from plastic components, such as the crimp ring 24CR, makes the dispenser subject to deformation as the dispenser is exposed to elevated temperatures and excessive temperatures. An elevated temperature refers to a temperature at or slightly below the heat distortion temperature for the given material. The heat distortion temperature (HDT) of a plastic material is the temperature at which the material deforms under a specific load. The HDT can be determined, for example, by ASTM D648 or ISO 75 standards. For polymeric materials such as polyethylene terephthalate (PET), the heat distortion temperature is related to the glass transition temperature of the polymer. The glass transition is a gradual transition of the amorphous region of the structure from a relatively hard and glassy state to a viscous state as the temperature is increased through the glass transition temperature. As will also be appreciated by those skilled in the art, a plastic material may exhibit significant distortion at temperatures slightly below the HDT depending on the applied stress and length of time the material is exposed to said the applied stress at elevated temperatures. The HDT for a given type of material will also vary depending on the plastic morphology, such as crystallinity, and the processing history. Thus, an elevated temperature of a bottle herein will be a temperature slightly below the heat distortion temperature where the plastic material of a bottle subject to an applied load will begin to distort. As temperatures exceed the HDT, the resulting modulus of the material will rapidly decrease. For containers exposed to these excessive temperatures, the resulting distortion of the components under load may create a potentially dangerous situation. The pressure within the dispenser combined with the reduced modulus of the components may reach a point where a component or portion of the dispenser is forcefully separated from the dispenser. The following disclosure addresses this situation and describes a dispenser that may safely depressurize. It is to be appreciated that the dispenser may maintain the seal formed between the crimp ring 24CR and the gasket 24G or the seal formed between the crimp ring 24CR and the valve cup 26 at elevated temperatures, and the dispenser may safely and effectively depressurize at excessive temperatures.

Figure 6A:
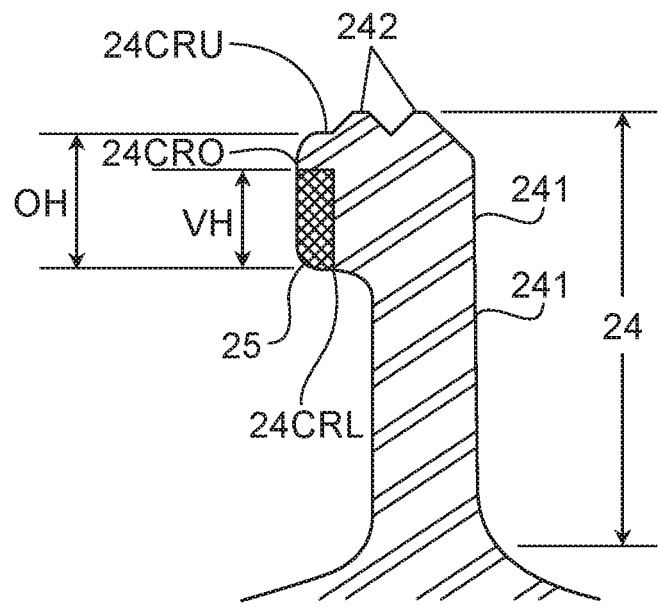
FIG. 6A is a partial detailed view taken from FIG. 3 of a crimp ring having a vent on the outer surface.
Figure 6B:
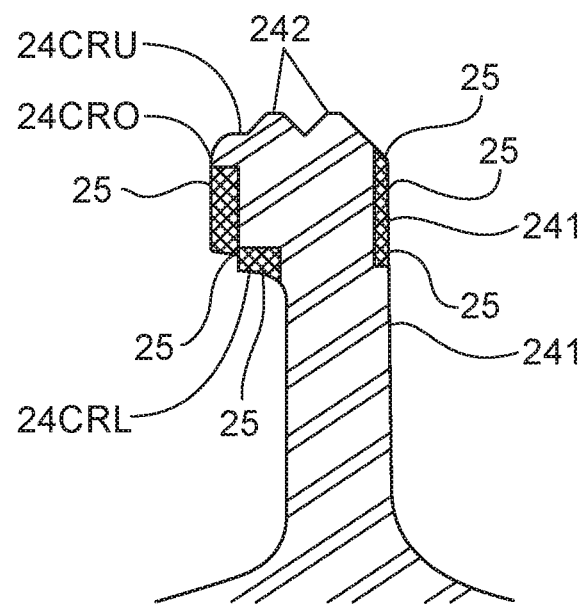
FIG. 6B is a partial detailed view taken from FIG. 3 of a crimp ring having a vent on the outer surface, a vent on the lower surface, and a vent on the inner diameter surface.
Figure 6C:
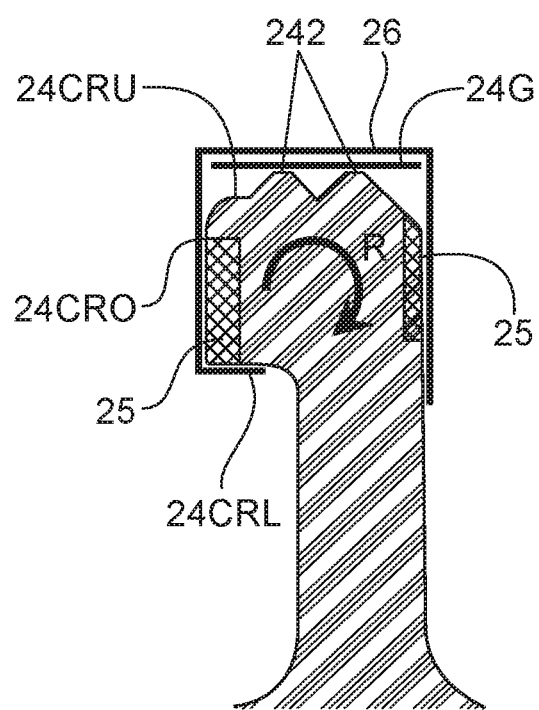
FIG. 6C is a partial detailed view illustrating the direction of rotation of the crimp ring during deformation.
Figure 7A:
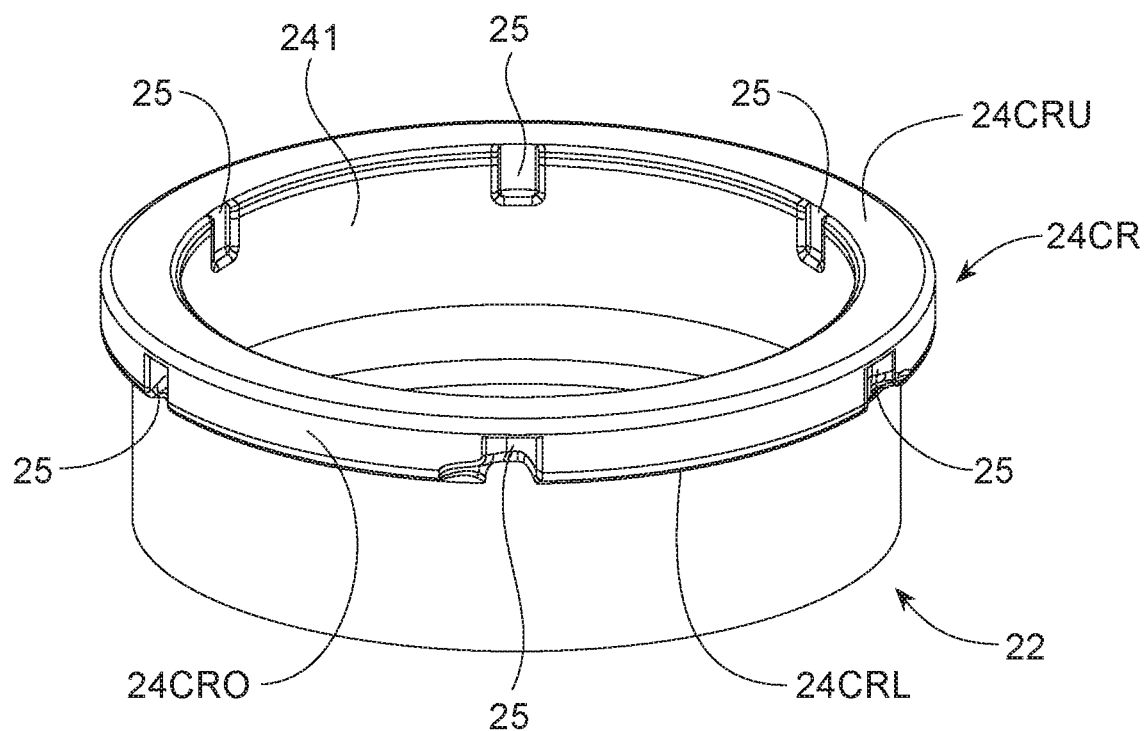
FIG. 7A is a partial perspective view of a crimp ring including vents.
Figure 7B:
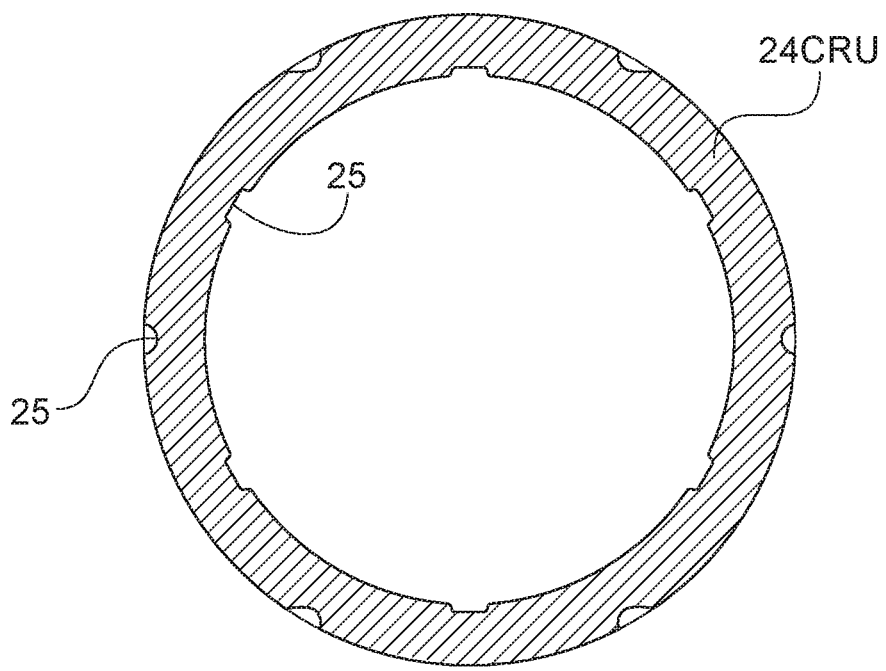
FIG. 7B is a top view of a crimp ring include vents.
Figure 7C:
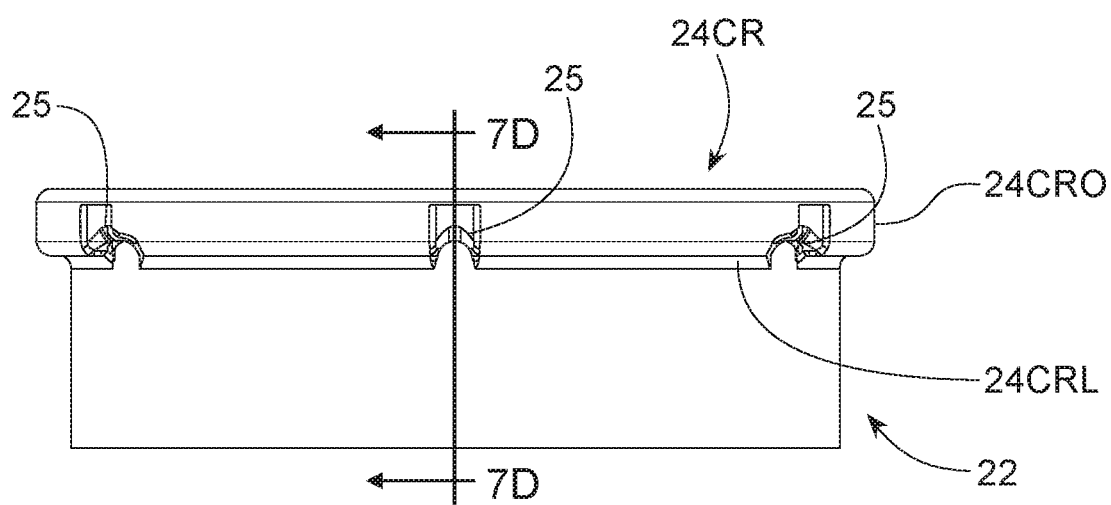
FIG. 7C is a side view of a crimp ring including vents.
Figure 7D:
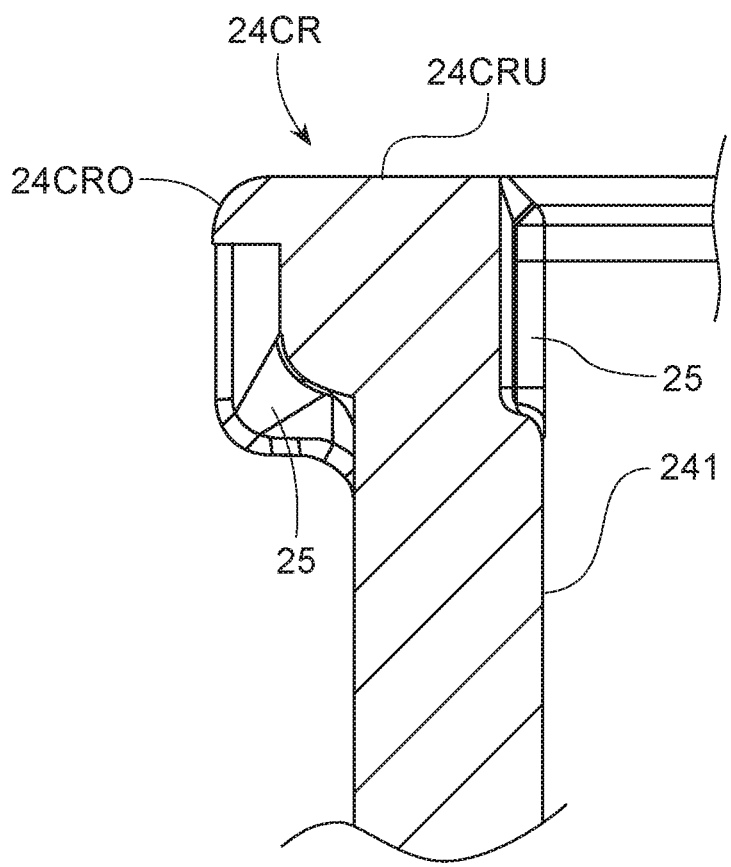
FIG. 7D is a partial sectional view taken along lines 7D-7D of FIG. 7C of the crimp ring.

As previously discussed, the crimp ring 24CR may include one or more vents 25 disposed on the outer surface 24CRO and the inner diameter surface 241. The vents 25 disposed on the outer surface 24CRO may extend from the upper surface 24CRO to the lower surface 24CRL. The crimp ring 24CR, which is made from plastic, when exposed to elevated temperatures may deform by separating from the annular beads 242, such as by rotating in a direction toward the longitudinal axis, as illustrated in FIG. 6C. The crimp ring 24CR may rotate in a direction as indicated by arrow R. As the gasket 24G separates from the crimp ring 24CR, the propellant and/or product may travel through the vent 25 positioned on the inner diameter surface 241, through the gap between the crimp ring 24CR and gasket 24G, and through the vent 25 defined by the outer surface 24CRO and/or the lower surface CRL. Thus, as soon as the crimp ring 24CR separates from the gasket 24G, a path may be created and product and/or propellant may be released.

However, due to the vent 25 extending through the upper surface 24CRO, the gasket 24G contacts less surface area on the upper surface 24CRU. This relatively smaller amount of surface area between the upper surface 24CRO and the gasket 24G may lead to more rapid separation of the gasket 24G and the crimp ring 24CR when the dispenser is exposed to elevated temperatures and failure to continue to maintain contact between the upper surface 24CRO and the gasket 24G as the crimp ring deforms. This may be undesirable because it may lead to the premature leakage of propellant and/or product or it may result in more product and/or propellant being released than is necessary to maintain a dispenser that is safe for consumers.

To better seal the gasket 24G to the crimp ring 24CR and to better control the release of propellant and/or product from the dispenser, the vent 25 on the outer surface 24CRO may not extend through the upper surface 24CRU. Stated another way, the vent 25 may extend through only a portion of the outer surface 24CRO such as illustrated in FIGS. 6A and 6B. The vent height VH may be less than the crimp ring 24CR outer surface height OH. The vent height VH and the outer surface height OH may be measured parallel to the longitudinal axis. By having the vent 25 terminate before reaching the upper surface 24CRU, the gasket 24G has a greater surface area over which to form a seal to the upper surface 24CRO of the crimp ring 24CR. It is to be appreciated that due to the greater surface area over which the upper surface 24CRO and the gasket 24G operatively engage to form a seal, the dispenser may maintain the seal at elevated temperatures for a relatively longer period of time and/or at a relatively higher pressures. Stated another way, the seal formed between the crimp ring 24CR and the gasket 24G minimizes or eliminates leakage of propellant and/or product at elevated temperatures.

Additionally, when the crimp ring CR24 is made from plastic, the crimp ring CR24 undergoes deformation, which may include rotation, when subject to elevated temperatures. Due to the vent 24 disposed on the outer surface CRO not extending through the upper surface 24CRU, the seal between the gasket 25G and the crimp ring 24CR may be maintained during some deformation of the crimp ring 24CR. More specifically, a vent 25 that extends through the upper surface 24CRU provides a pathway for propellant and/or product to be released upon the relatively small deformation of the crimp ring 24CR, such as the crimp ring 24CR pulling away from the gasket 24G. By contrast, a vent 25 that does not extend through the upper surface 24CRU does not necessarily readily create a pathway for propellant and/or product to be released because even with some deformation; a portion of the outer surface 24CRO and the upper surface 24CRU proximate to the vent 25 that does not extend through the upper surface 24CRU may maintain contact with the valve cup 26 even if there is some separation between the crimp ring upper surface 24CRU and the gasket 24G. For the vent 25 that does not extend through the upper surface 24CRU a relatively greater amount of deformation, such as by rotation or shrinkage, that results in the portion of the outer surface CRO becoming separated from the valve cup 26 may be required to create a pathway for the propellant and/or product to be released. Despite having a relatively, more robust seal, this design still allows the dispenser to be safely used by a consumer. Further, as illustrated in FIGS. 6A and 6B, the vent 25 disposed in the outer surface 24CRO of the crimp ring 24CR may be used in combination with other vents 25, as previously discussed, which may include a vent 25 extending through the lower surface 24CRL and/or a vent 25 on the inner diameter surface 241.

However, for a crimp ring 24CR including a vent 25 disposed on the outer surface 24CRO and the inner diameter surface 241 that is subject to excess temperature, the crimp ring 24CR may deform, such as by rotation and/or shrinkage, and separate from the gasket 24G and/or the valve cup 26. The combination of the outer surface vent, the inner surface vent, and the separation between the gasket 24G and/or the valve cup 26 and the upper surface 24CRU of the crimp ring 24CR allows for a pathway for propellant and/or product to be released. The release of propellant and/or product depressurizes the dispenser subject to excess temperature.

Further still, a crimp ring 24CR including a vent 25 disposed on the outer surface 24CRO that extends through a portion of the outer surface 24CRO also aids in allowing the crimp ring 24 to reseal against, for example, the valve cup 26 once the dispenser has released enough propellant and/or product to safely operate. The upper surface CRU of the crimp ring 24 has a greater surface area when the vent 25 does not extend therethrough. By increasing the upper surface area CRU, it is believed that a portion of the crimp ring 24 may more readily reseal to the valve cup 26 and/or the gasket 24. By having the crimp ring 24CR reseal to the valve cup 26 and/or gasket 24 once enough propellant and/or product has been released may allow the consumer to continue using the dispenser.

In some embodiments, it may be desirable to have a dispenser with a relatively higher amount of pressure. As the pressure within the dispenser increases, the seal may be required to be more robust to prevent leakage at elevated temperatures. To achieve a relatively more robust seal, the annular beads 242 may be removed from the upper surface 24CRU of the crimp ring 24CR. It is believed that by removing the annular beads 242, the force exerted by the gasket 24G on the upper surface 24CRU of the crimp ring 24CR is more evenly distributed across the entire upper surface 24CR as opposed to having two annular beads which cause the force of the gasket 24G to be concentrated at the peaks of the annular beads. A more even force distribution may lead to a relatively more robust seal. Further, it is to be appreciated that as the crimp ring 24 undergoes deformation, such as by rotation, the removal of the annular beads 242 allows the gasket 24G to maintain contact with the crimp ring 24 as the crimp ring 24CR deforms. Stated another way, by not creating gaps between the gasket and the crimp ring 24CR such as when the crimp ring 24CR includes annular beads, the crimp ring 24CR may move relative to the gasket 24CR allowing the seal to be maintained, which prevents premature leakage at elevated temperatures.

Referring to FIGS. 7A-7D, the crimp ring 24CR may have an upper surface 24CRU having a substantially planar surface. The substantially planar surface of the upper surface 24CRU provides a greater surface area over which the force of the gasket 24G is disposed. The force applied by the gasket 24G may be substantially evenly distributed across the substantially planar surface of the upper surface 24CRU. The substantially planar surface may extend from about the inner diameter surface 241 to about the outer surface 24CRO. One or more vents 25 may be used in combination with the substantially planar surface of the upper surface 24CRU. As previously discussed, any one or combination of a vent 25 extending through a portion of the outer surface 24CRO, a vent 25 disposed in the lower surface 24CRL, and a vent disposed in the inside diameter surface 241 may be used. As previously discussed, due to the upper surface 24CRU being a substantially planar surface, the gasket 24G may remain operatively engaged with the upper surface 24CRU at elevated temperatures. Further, the substantially planar surface may aid in resealing of the crimp ring 24CR to the valve cup 26 once a sufficient amount of product and/or propellant has been removed from the dispenser.

Referring to FIGS. 8A-8C and 9A-B, in some embodiments, the upper surface 24CRU may include a continuous convex surface. The continuous convex surface is a surface that is substantially free from concavities, and thus, is not concave. The continuous convex surface is a surface having one or more radii of curvature extending in a direction away from the lower surface 24CRL and such that the force is more evenly distributed over the entire upper surface 24CRU. The radii of curvature may include any positive radius of curvature up to an infinite radius of curvature, in the case of a flat portion of the surface. Similar to the above, the continuous convex surface may provide a relatively more robust seal, which prevents premature release of propellant and/or product at elevated temperatures and relatively higher pressures. Further, the continuous convex surface provides an upper surface having a relatively greater surface area. This relatively greater surface area may allow the dispenser to maintain a seal during deformation, such as by rotation, of the crimp ring 24CR and to more readily reseal once a sufficient amount of propellant and/or product is released. The continuous convex surface may extend from about the inner diameter surface 241 to about the outer surface 24CRO. One or more vents 25 may be used in combination with the continuous convex surface of the upper surface 24CRU. As previously discussed, any one or combination of a vent 25 extending through a portion of the outer surface 24CRO, a vent 25 disposed in the lower surface 24CRL, and a vent disposed in the inside diameter surface 241 may be used.

The dispenser may also be subject to excessive temperatures. The substantially planar surface and the continuous convex surface of the upper surface 24CRU of the crimp ring 24CR allows for release of product and/or propellant when the dispenser is exposed to excessive temperatures. When the dispenser is subject to excessive temperatures, the plastic crimp ring 24CR may deform, including rotating in a direction toward the longitudinal axis. Generally, the greater the temperature, the greater the deformation of the crimp ring 24CR. The deformation of the crimp ring 24CR may result in separation of the crimp ring 24CR from the gasket 24G and/or the value cup 26. Upon separation, a gap is formed between the crimp ring 24CR and the gasket 24G and/or the valve cup 26. The product and/or propellant may be released through the vent 25 disposed on the inner diameter surface, through the gap, and, finally, through the vent 25 disposed on the outer surface 24CRO. The release of product and/or propellant is controlled and allows for the depressurization of the dispenser when a sufficient amount of propellant and/or product has been released. The depressurization of the dispenser is done safely such that the depressurization may occur in the presence of a consumer and does not create a hazardous situation.

In summary, generally, the dispenser may maintain a seal between the crimp ring 24CR and the gasket 24G and/or valve cup 26 at an elevated temperature. As the pressure of the dispenser increases, a relatively more robust seal is needed to maintain the seal at elevated temperatures. A relatively more robust seal may be created by increasing the surface area of the operative engagement between the upper surface CRU and the gasket 24G and/or the valve cup 26.

The surface area may be increased by changing the surface profile of the upper surface 24CRU, such as by having a substantially planar surface or a continuous convex surface. Additionally, the surface area may be increased by having the vent 25 disposed on the outer surface 24CRO extend through only a portion of the outer surface and not extend through the upper surface 24CRU. The aforementioned modifications may allow for a dispenser to prevent leakage of propellant and/or product at elevated temperatures. Further, the dispenser may safely mitigate overpressurization at excessive temperatures. The above disclosed configurations of the upper surface 24CRU and the vent 25 design also allows for safe and effective release of product and/or propellant to relieve the overpressurization of the dispenser.

It is to be appreciated that although throughout the disclosure the dispenser is referred to as containing propellant and/or product any fluid and/or gas may be contained in the dispenser. One of ordinary skill in the art would recognize that there are various fluids and gasses which may behave similar to the propellant and product and readily adapt the teachings within this disclosure to such.

It is also to be appreciated that a dispenser may not include a gasket 24G. In some embodiments, the upper surface 24CRU may operatively engage the valve cup 26 to form a seal.

It is to be appreciated that the neck or a portion thereof may be subject to a thermal crystallization process to stabilize the material from deformation and to control movement of the plastic at elevated temperatures. Crystallization may be performed as described in U.S. Pat. No. 9,758,294. In some embodiments, the area of neck adjacent to the crimp ring 24CR may be crystalized. This will allow for movement of the crimp ring 24CR while the area adjacent the crimp ring remains substantially stable.

In some embodiments, a dispenser including the characteristics as previously described may maintain a seal such that no propellant and/or product is released at or below about 65° C. At temperatures above about 65° C., the plastic crimp ring 24CR may undergo deformation and overpressurization of the dispenser may result. However, the dispenser as described may allow for releasing a sufficient amount of propellant and/or product to alleviate the overpressurization and, in some embodiments, allow for resealing and continued use of the dispenser. It is also to be appreciated that some excessive temperatures may result in the dispenser safely venting the excessive pressure and no longer containing enough propellant and/or product to continue use by a consumer.

Figure 10:
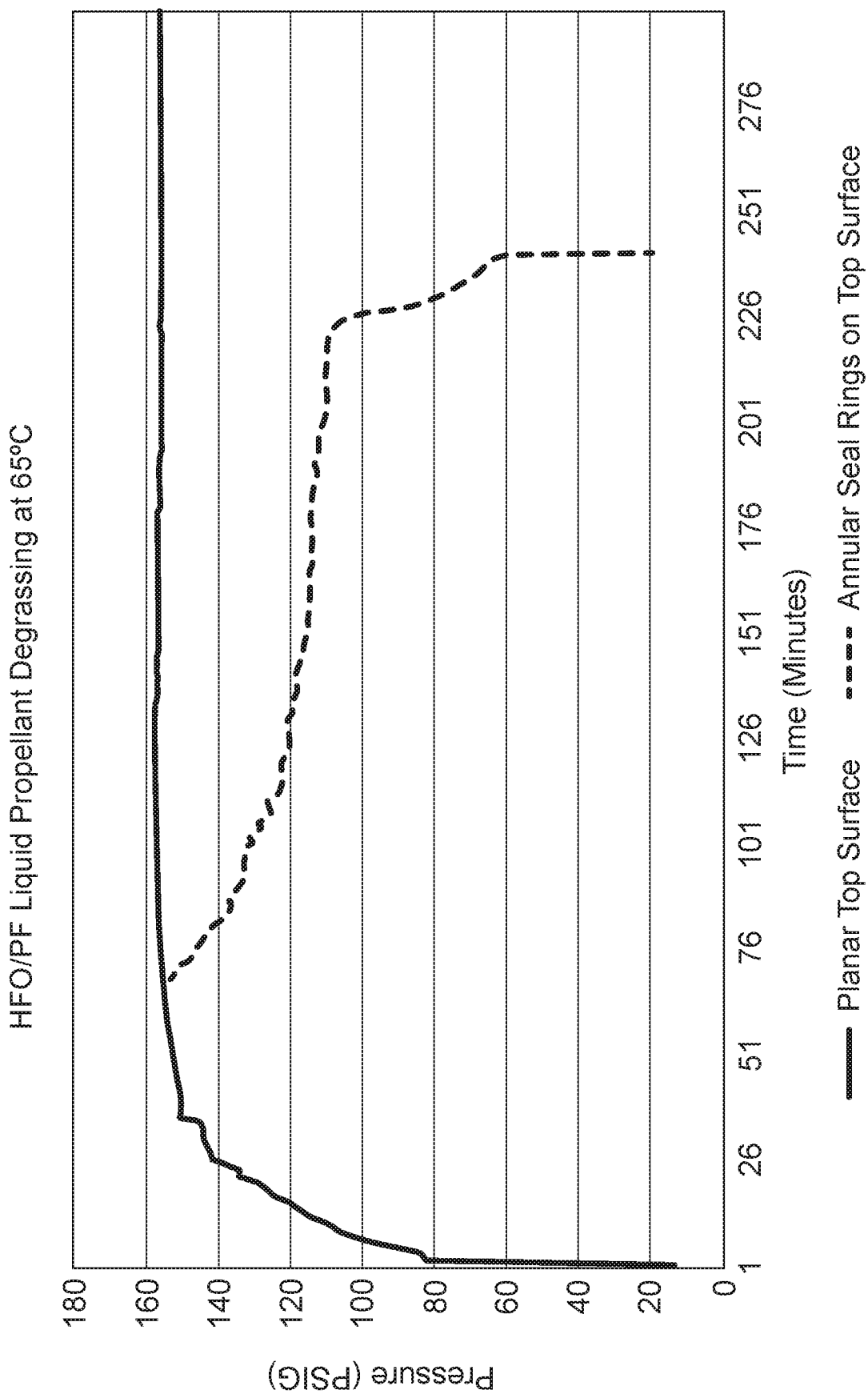
FIG. 10 is an illustration of the results of a pressure test.

For example, FIG. 10 illustrates the results of a pressure relief test conducted using an embodiment of a dispenser as discussed herein. The test was conducted by filling a plastic aerosol dispenser with 45 g of water and 30 ml of 70:30 HFO ZE/PF propellant, leaving about 20-30% of void space in the dispenser. The initial pressure was measured for each dispenser by using a pressure gauge through the valve stem. A climate control chamber was used and the temperature was set to 65° C. The prepared dispensers were placed in the middle of the climate control chamber once the chamber had reached 65° C. The dispensers were placed in the chamber such that the dispensers were vertically oriented such that the valve was not in contact with product contained in the dispenser. The test was conducted for five hours per the FEA-X8-647E Hot Air Testing. When testing was complete, the dispenser was allowed to cool to ambient temperature. The pressure over time was recorded and rupture and leak events were also recorded.

A comparison of the behavior of the pressurized dispensers at elevated temperature conditions was made by following the FEA-X8-647E Hot Air Test described above. One of the containers in this test included a dispenser having the upper surface of the crimp ring 24CRU with a substantially planar surface, such as illustrated in FIG. 7. The second dispenser included a crimp ring 24CRU having an upper surface 24CRU with two annular seal beads 242, such as illustrated in FIG. 6B. The internal pressure of the dispensers was measured versus time in the climate control chamber for these two containers, and the results are provided in FIG. 10. The two pressure curves are nearly coincident for about the first hour of the test procedure. However, the internal pressure for the dispenser with the annular seal beads 242, illustrated in FIG. 10 with a dashed line, begins to lose internal pressure while the internal pressure for the dispense with the substantially planar surface maintains a near constant internal pressure for the duration on the five hour test. In this elevated temperature test condition of 65° C., the dispenser with the substantially planar upper crimp ring surface 24CRU maintained a seal between the crimp ring and the gasket while the dispenser with the two annular beads 242 did not maintain the seal between the gasket and the crimp ring and prematurely lost pressure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An outer container for use in an aerosol dispenser, the outer container comprising:
  a crimp ring defining an open top and extending about a longitudinal axis;
  a lower neck portion adjacent the crimp ring;
  a sidewall extending between the lower neck portion to a closed end bottom, wherein the crimp ring comprises:
    an upper surface and a lower surface opposite the upper surface, wherein the upper surface and the lower surface are joined by an outer surface, and wherein the upper surface is a substantially planar surface; and an inner surface opposite the outer surface, wherein at least one of the inner surface and the outer surface of the crimp ring has a vent;
a valve cup joined to the crimp ring, a valve disposed in the valve cup, propellant disposed in the outer container, wherein the valve cup has an outer wall defining at least three circumferentially spaced holes.

2. The outer container of claim 1, wherein the vent is disposed on the outer surface of the crimp ring and extends from the upper surface to the lower surface of the crimp ring.

3. The outer container of claim 1, wherein the vent is disposed on the outer surface of the crimp ring and extends from the lower surface through a portion of the outer surface.

4. The outer container of claim 1, comprising a plurality of circumferentially spaced axially parallel vents disposed on the outer surface of the crimp ring.

5. The outer container of claim 1, comprising a plurality of integrally injection molded circumferentially spaced vents disposed on the outer surface of the crimp ring.

6. The outer container of claim 1, comprising a first plurality of integrally injection molded circumferentially spaced vents disposed on the outer surface of the crimp ring and a second plurality of circumferentially spaced vents disposed on the inside diameter surface of the crimp ring.

7. The outer container of claim 1, comprising a first plurality of integrally injection molded vents circumferentially spaced and axially oriented disposed on the outer surface of the crimp ring and radially oriented on the lower surface of the crimp ring, and a second plurality of circumferentially spaced vents disposed on the inside diameter surface of the crimp ring.

8. The outer container of claim 1, comprising a valve cup joined to the crimp ring, a valve disposed in the valve cup, and a propellant disposed in the outer container.

9. The outer container of claim 1, comprising a shoulder adjacent the crimp ring, wherein the lower neck portion extends from the crimp ring to the shoulder.

10. The outer container of claim 1, wherein the crimp ring is made of plastic.

11. The outer container of claim 1, wherein a portion of the lower neck portion is crystalized.

12. An aerosol dispenser for dispensing a product, the aerosol dispenser comprising:
an outer container defining an open top and having a bottom opposite the open top;
a crimp ring extending about the open top of the outer container;
a sidewall extending between the crimp ring and the bottom of the outer container;
a valve cup joined to the crimp ring;
a valve joined to the valve cup for dispensing product from the outer container; and
a propellant disposed in the outer container,
wherein the crimp ring comprising:
an upper surface and a lower surface opposite the upper surface, wherein the upper surface and the lower surface are joined by an outer surface, and
wherein the upper surface is a substantially planar surface; and
an inner surface opposite to the outer surface, wherein at least one of the inner surface and the outer surface of the crimp ring has a vent;
wherein the valve cup has an outer wall with at least three circumferentially spaced holes therethrough.

13. The aerosol of claim 12, wherein a gasket is positioned between a portion of the valve cup and the crimp ring.

14. The aerosol dispenser of claim 12, having vents disposed on both of the inner diameter surface and the outer surface of the crimp ring.

15. The aerosol dispenser of claim 12, having vents disposed on both of the inner diameter surface and the outer surface of the crimp ring and further comprising radial vents disposed on the lower surface of the crimp ring.

* * * * *